United States Patent [19]

Lindackers et al.

[11] Patent Number: 4,722,507
[45] Date of Patent: Feb. 2, 1988

[54] PISTON SEALING RING APPARATUS

[75] Inventors: Rudolf Lindackers, Viersen 11-Dulken; Willy V. D. Weydt, Tonisvorst-Vorst, both of Fed. Rep. of Germany

[73] Assignee: Masoneilan International, Inc., Dallas, Tex.

[21] Appl. No.: 908,443

[22] Filed: Sep. 17, 1986

[30] Foreign Application Priority Data

Sep. 25, 1985 [DE] Fed. Rep. of Germany ....... 3534135

[51] Int. Cl.[4] .............................. F16K 31/44; F16J 1/06
[52] U.S. Cl. ........................................ 251/80; 92/181 P; 92/193; 92/247; 137/625.3; 137/625.38; 137/625.39; 251/205; 251/210; 251/282; 251/325; 277/102; 277/125
[58] Field of Search ....................... 92/181 P, 193, 195, 92/247; 137/625.3, 625.33, 625.37, 625.38, 625.39; 251/80, 205, 210, 282, 324, 325; 277/102, 103, 113, 114, 123, 125

[56] References Cited

U.S. PATENT DOCUMENTS

| | | | |
|---|---|---|---|
| 1,489,608 | 4/1924 | Miller | 92/193 |
| 1,517,593 | 12/1924 | Slate | 92/193 |
| 1,802,897 | 4/1931 | Holden et al. | 251/210 |
| 2,468,511 | 4/1949 | Pilch | 92/194 |
| 2,736,625 | 2/1956 | Naab | 92/193 |
| 3,010,695 | 11/1961 | Banks | 251/205 |
| 3,150,569 | 9/1964 | Attermeyer | 92/193 |
| 3,259,358 | 7/1966 | Tripoli | 277/102 |
| 3,312,150 | 4/1967 | Strader | 92/252 |
| 3,382,772 | 5/1968 | Kampert et al. | 92/247 |
| 3,821,968 | 7/1974 | Barb | 137/625.3 |
| 3,987,705 | 10/1976 | Strassheimer | 92/248 |
| 4,375,821 | 3/1983 | Nanao | 251/210 |

FOREIGN PATENT DOCUMENTS

| | | |
|---|---|---|
| 925559 | 3/1925 | Fed. Rep. of Germany . |
| 683783 | 11/1939 | Fed. Rep. of Germany . |
| 921248 | 12/1954 | Fed. Rep. of Germany . |
| 1625914 | 7/1970 | Fed. Rep. of Germany . |
| 1951376 | 7/1971 | Fed. Rep. of Germany ...... 251/205 |
| 2452692 | 5/1975 | Fed. Rep. of Germany . |
| 2919403 | 12/1979 | Fed. Rep. of Germany . |
| 3003157 | 8/1981 | Fed. Rep. of Germany . |
| 3010829 | 10/1981 | Fed. Rep. of Germany . |
| 8031617 | 2/1982 | Fed. Rep. of Germany . |
| 3241867 | 5/1984 | Fed. Rep. of Germany . |
| 3323361 | 4/1985 | Fed. Rep. of Germany . |
| 3429783 | 2/1986 | Fed. Rep. of Germany . |
| 1023906 | 3/1953 | France . |
| 1024868 | 4/1953 | France . |
| 121632 | 12/1918 | United Kingdom . |
| 614146 | 12/1948 | United Kingdom . |
| 679019 | 9/1952 | United Kingdom . |

*Primary Examiner*—George L. Walton

[57] ABSTRACT

A sealing ring device is provided for a fluid valve having a piston (2) reciprocating within a cylinder (1), wherein the piston (2) includes a valve cone (2c) adapted to contact a valve seat (11). In order to seal the inner space of the cylinder (1) located behind the piston (2) from an inlet/outlet passageway (A), a resilient sealing ring (5) is disposed in an annular groove (4) opening into the cylinder (1) around the rear end (2a) of the piston (2). A press ring (7), which extends above the rear end (2a) of the piston (2), contains the sealing ring (5) in the annular groove (4). A spring element (8) rests on the press ring (7). A piston rod (3) is guided in slidable manner through the piston (2). A stop (9) is attached to the rod (3) above the rear end (2a) and opposite the top side of the spring element (8). Downward movement of the rod (3) past the end position of piston (2) causes the stop (9) to compress the spring element (8), and the resulting force is transferred by the press ring (7) to the sealing ring (5) to expand the sealing ring (5) against the piston (2) and the cylinder (1).

16 Claims, 1 Drawing Figure

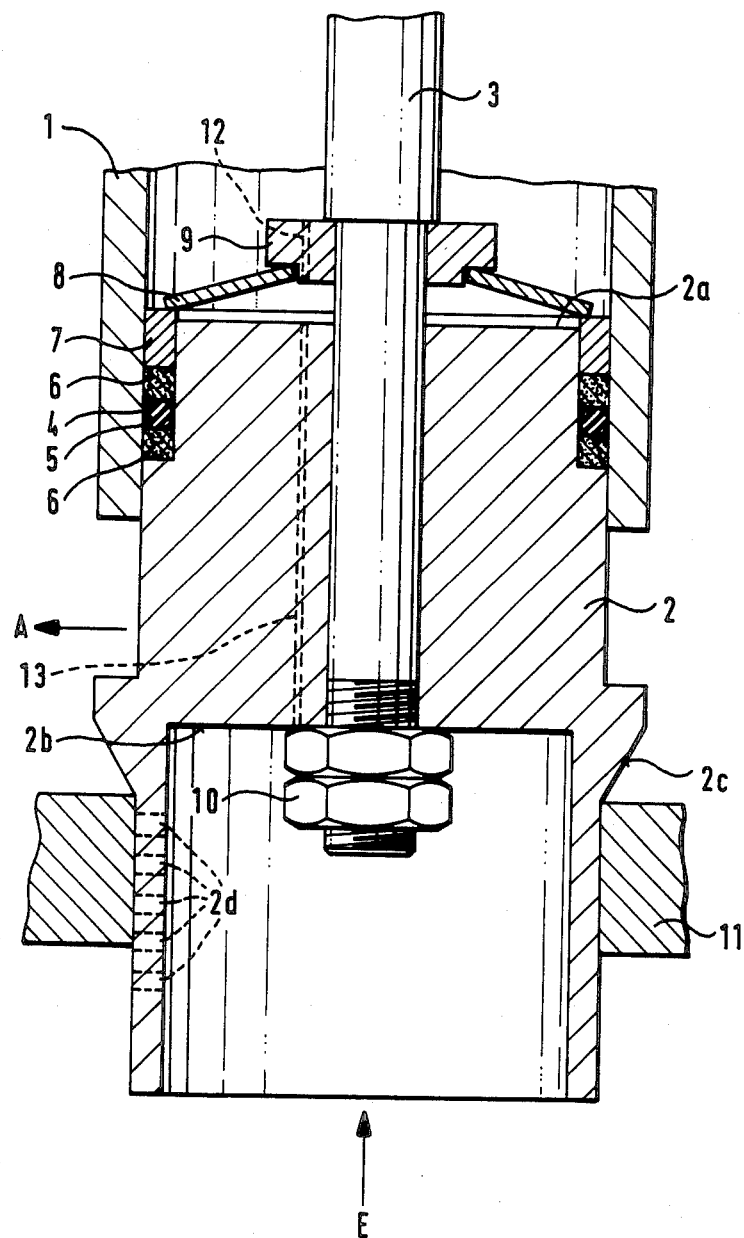

PISTON SEALING RING APPARATUS

TECHNICAL FIELD

This invention relates to piston sealing rings and, in particular, to a sealing ring device having variable sealing force to reduce wear caused by high friction during piston movement.

BACKGROUND OF THE INVENTION

The present invention relates to a sealing ring apparatus for a fluid valve having a piston reciprocating within a cylinder. Fluid valves of this type include a cylinder having inlet/outlet passageways external to the cylinder. A piston having a hollow front end for receiving a pressurized fluid includes inlet/outlet ports through its side walls. A connecting rod attached to the rear end of the piston provides reciprocating motion of the piston within the cylinder to seat and unseat a valve cone formed around the front end of the piston and adapted to contact a valve seat. The fluid valve is opened by reciprocation of the piston to unseat the valve cone and align the inlet/outlet ports of the piston with the inlet/outlet passageways. A ring comprising resilient material is packed in an annular groove around the rear end of the piston to provide a seal between the piston and the inside surface of the cylinder.

Known sealing rings for this type of fluid valve have the disadvantage that the ring packing arranged around the surface of the piston must be under a considerable amount of pressure for a reliable seal to be achieved. As a result, frictional forces are created which hinder the piston movement and also lead to considerable wear of the structural parts. Thus, there is a need for a piston sealing apparatus which provides a reliable seal when the fluid valve is closed but which creates low frictional forces when the piston is reciprocated.

SUMMARY OF THE INVENTION

In many applications of the type of fluid valve described above, a reliable seal between the cylinder and the piston is necessary only in the end position of the piston when the valve cone is seated on the valve seat.

The present invention comprises a sealing device for the type of valve described above wherein full tightening of the piston sealing ring against the inner wall of the cylinder takes place only in the end position of the piston when the valve is closed. The present invention achieves a reliable seal in the end position of the piston, but in the initial and intermediate positions during reciprocation of the piston the force on the sealing ring is reduced so that friction between the sealing ring and the cylinder does not hinder movement of the piston or cause undue wear.

In the present invention, the sealing ring is arranged in an annular groove around the cylindrical surface of the piston at the rear end of the piston. A press ring surmounts the sealing ring to contain it in the annular groove of the piston. A piston connecting rod is slidably connected to the piston through the axis thereof. A stop is fixedly attached to the piston rod at a preset distance from the rear end of the piston. A spring element is disposed between the press ring and the stop to apply a force to the press ring to expand the sealing ring against the inside surfaces of the piston and cylinder.

A disk spring, a set of several disk springs, a compression spring, or any other suitable type of springs can serve as the spring element. The frictional connection between the spring element and the press ring and the stop can be effected by a direct fitting of the spring element against these parts. However, other components such as transfer elements can be interposed between the press ring and the stop.

The present invention is applicable to the sealing of a valve cone on a valve seat with pressure equalization on both sides of the piston. In such an application, the space behind the piston is connected to the space in front of the piston by a duct through the piston. In the closed position of the valve, these spaces on both sides of the piston are sealed against the inlet/outlet passageways external to the cylinder. Thus, the valve can remain sealed when either the space behind or in front of the piston or the space connected to the inlet/outlet passageways is under excess pressure.

With the sealing device of the present invention, no pressure or only a slight amount of pressure is exerted on the sealing ring packing during the closing and opening movement of the piston, so that low friction movement of the piston is possible. However, in the end position of the piston when the valve is closed, the sealing ring is forced firmly against the cylinder wall so that a reliable seal is obtained.

BRIEF DESCRIPTION OF THE DRAWINGS

For a more complete understanding of the present invention and for further advantages thereof, reference is made to the following Detailed Description taken in conjunction with the accompanying Drawings, in which the FIGURE is a longitudinal cross-sectional view of the fluid valve and sealing ring apparatus of the present invention.

DETAILED DESCRIPTION

Referring to the FIGURE, the parts of a fluid regulating valve which are of importance to the sealing ring device of the present invention are shown in section.

A piston 2 is guided within a cylinder 1 and reciprocated by a piston rod 3. Piston 2 includes input/output ports 2d and an extension at its external side forming valve cone 2c which seats on valve seat 11.

In the FIGURE, piston 2 is shown at its lower end position in which valve cone 2c is seated on valve seat 11. By movement of piston 2 in the upward direction, the valve opens so that via ports 2d an inlet E (not shown) becomes connected increasingly to an outlet A provided external to piston 2 and cylinder 1.

The space behind piston 2, i.e. the space above the rear end 2a of piston 2 in the FIGURE, is connected to the space in front of piston 2 and thus to inlet E by duct 13, so that pressure equalization is maintained above and below piston 2 as shown in the FIGURE.

A sealing device with a sealing ring 5 is arranged in an annular groove 4 arranged around the cylindrical surface of piston 2. Annular groove 4 opens at the rear end 2a of the piston into the cylinder. Sealing ring 5 serves to seal the space above piston 2 from the outlet A. The sealing device consists of a sealing ring 5 made of resilient material which is arranged between guiding elements 6. In the preferred embodiment, the sealing ring 5 can consist of a graphite packing, while the guiding elements 6 can consist of electrolytic carbon.

Above the sealing ring 5 and guiding elements 6 in the annular groove 4, a press ring 7 is arranged in movable manner and is dimensioned to project slightly above the rear end 2a of piston 2. A truncated coneshaped disk spring 8 is set on the top side of press ring 7 so that its lower outer edge rests on the press ring 7 projecting slightly above the rear end 2a of piston 2.

At its lower end, piston rod 3 is led through a bore of piston 2 in slidable manner. At a preset distance above the rear end 2a, a plate-shaped stop 9 is fixedly attached to rod 3. The upper inner edge of the disk spring 8 braces itself against stop 9. A duct 12 is bored through stop 9 parallel to the axis of piston rod 3 and aligned with duct 13 in piston 2.

An additional stop 10, such as a screwed nut arrangement, is positioned at the end of piston rod 3 below front end 2b of piston 2.

In the position of piston 2 shown in the FIGURE and in all intermediate positions in which the piston is located higher and the valve is partially or completely opened, the disk spring 8 is not compressed or only slightly compressed, so that only a small pressure is exerted in the axial direction by press ring 7 on sealing ring 5. Thus, the contact pressure of the sealing ring 5 on the inner wall of cylinder 1 is relatively slight and piston 2 can be moved in cylinder 1 without high friction forces occurring. However, in these positions the seal between the inner space of the cylinder located above piston 2 and outlet A is less than the maximum attainable value.

When in the end position of piston 2 shown in the drawing, i.e. the closed position of the valve, the piston rod 3 can be moved further downward so that disk spring 8 is compressed by stop 9 until spring 8 is fully compressed and stop 9 contacts the rear end 2a of piston 2. As a result, the force exerted on the top side of press ring 7 increases considerably and the sealing ring 5 is compressed and expanded against the surfaces of piston 2 and cylinder 1. As a result of this slight additional stroke of piston rod 3, the final and satisfactory seal between the space above piston 2 and outlet A is achieved.

During opening of the valve, the first lifting of the piston rod 3 relieves the compression of disk spring 8 and thereby reduces the contact pressure on the sealing ring 5. When the second stop 10 hits the front end 2b of piston 2 and the piston rod 3 is moved further upwards, the valve opens.

Although the present invention has been described with respect to a specific embodiment thereof, various changes and modifications may be suggested to one skilled in the art, and it is intended that the present invention encompass such changes and modifications as fall within the scope of the appended claims.

We claim:

1. A sealing apparatus for a piston slidably disposed within a cylinder, comprising:
   a piston rod extending axially and slidably through the piston, said piston rod having reciprocating axial motion;
   an annular groove extending around a first end of the piston and opening into the cylinder;
   a resilient sealing ring disposed within said annular groove between the piston and the cylinder;
   a press ring disposed within said annular groove to contain said sealing ring in said annular groove, said press ring extending beyond said first end of the piston;
   a first stop being in engagement with said piston rod at a predetermined distance from said first end of the piston; and
   a resilient means connected between said first stop and said press ring, said first stop being movable by the piston rod in a direction toward said first end of said piston whereby a portion of said resilient means engages a top portion of said press ring for biasing said press ring against said sealing ring in said annular groove in only one direction of piston movement for increasing the sealing force of said sealing ring between the piston and the cylinder.

2. The sealing device of claim 1, further comprising a second stop rigidly attached to said piston rod at a second end of the piston.

3. The sealing device of claim 2, wherein said biasing means comprises an annular disk spring having an inner rim connected to said first stop and an outer rim contacting said press ring.

4. The sealing device of claim 3, further comprising:
   a valve having a valve seat; and
   a valve cone disposed around said second end of the piston for contacting said valve seat to close said valve.

5. The sealing device of claim 4, wherein said axial motion of said piston rod toward said second end forces said valve cone against said valve seat and compresses said spring, thereby applying pressure to said press ring to expand said sealing ring.

6. The sealing device of claim 5, wherein said spring applies pressure to said press ring only when said valve is closed by said valve cone.

7. The sealing device of claim 5, wherein:
   said first stop includes a first axial duct;
   the piston includes a second axial duct; and
   said first and second ducts provide pressure equalization between the cylinder and said second end of the piston.

8. A sealing apparatus for a fluid valve, comprising:
   a piston slidably disposed within a cylinder, said piston having a valve cone for closing said valve by contacting a valve seat;
   a piston rod extending axially and slidably through said piston and having a first stop being in engagement with said rod at a predetermined distance from a first end of said piston and a second stop rigidly attached to said rod at a second end of said piston, said piston rod having reciprocating axial motion;
   an annular groove extending around said first end of said piston and opening into said cylinder;
   a resilient sealing ring disposed within said annular groove between said piston and said cylinder;
   a press ring disposed within said annular groove to contain said sealing ring in said annular groove, said press ring extending beyond said first end of said piston; and
   a resilient means connected between said first stop and said press ring, said first stop being movable by the piston rod in a direction toward said first end of said piston whereby a portion of said resilient means engages a top portion of said press ring for biasing said press ring against said sealing ring in said annular groove in only one direction of piston movement for increasing the sealing force of said sealing ring between the piston and the cylinder.

9. The sealing device of claim 8, wherein said biasing means comprises an annular disk spring having an inner rim connected to said first stop and an outer rim contacting said press ring.

10. The sealing device of claim 9, wherein said axial motion of said piston rod toward said second end forces said valve cone against said valve seat and compresses said spring, thereby applying pressure to said press ring to expand said sealing ring.

11. The sealing device of claim 10, wherein said spring applies pressure to said press ring only when the valve is closed by said valve cone.

12. The sealing device of claim 10, wherein:
said first stop includes a first axial duct;
said piston includes a second axial duct; and
said first and second ducts provide pressure equalization between said cylinder and said second end of said piston.

13. A sealing apparatus for a fluid valve having a piston slidably disposed within a cylinder, comprising:
a piston rod extending axially and slidably through the piston and having a first stop being in engagement with said rod at a predetermined distance from a first end of the piston and a second stop rigidly attached to said rod at a second end of the piston, said piston rod having reciprocating axial motion;
an annular groove extending around said first end of the piston and opening into the cylinder;
a valve cone disposed around said second end of the piston for contacting a valve seat to close the valve;
a resilient sealing ring disposed within said annular groove between the piston and the cylinder;
a press ring disposed within said annular groove to contain said sealing ring in said annular groove, said press ring extending beyond said first end of the piston; and
a resilient means connected between said first stop and said press ring, said first stop being movable by the piston rod in a direction toward said first end of said piston whereby a portion of said resilient means engages a top portion of said press ring for biasing said press ring against said sealing ring in said annular groove, wherein said axial motion of said piston rod toward said second end forces said valve cone against said valve seat and forces said biasing means to apply pressure to said press ring to expand said sealing ring between the piston and the cylinder only during movement of said valve cone in a closing direction.

14. The sealing device of claim 13, wherein said biasing means comprises an annular disk spring having an inner rim connected to said first stop and an outer rim contacting said press ring.

15. The sealing device of claim 14, wherein said spring applies pressure to said press ring only when the valve is closed by said valve cone.

16. The sealing device of claim 13, wherein:
said first stop includes a first axial duct;
the piston includes a second axial duct; and
said first and second ducts provide pressure equalization between the cylinder and said second end of the piston.

* * * * *